United States Patent
Hayano (10) Patent No.: US 7,161,643 B2
(45) Date of Patent: Jan. 9, 2007

(54) LIQUID CRYSTAL DISPLAY DEVICE

(75) Inventor: Satoshi Hayano, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 217 days.

(21) Appl. No.: 10/937,869

(22) Filed: Sep. 10, 2004

(65) Prior Publication Data

US 2005/0099554 A1    May 12, 2005

(30) Foreign Application Priority Data

Sep. 18, 2003   (JP)   ............... 2003-325732

(51) Int. Cl.
*G02F 1/1333*   (2006.01)
(52) U.S. Cl. ..................................... 349/58
(58) Field of Classification Search .............. 349/58; 361/681–682
See application file for complete search history.

(56) References Cited

U.S. PATENT DOCUMENTS

| | | | |
|---|---|---|---|
| 6,175,396 B1 | 1/2001 | Kim et al. | |
| 6,504,586 B1 * | 1/2003 | Lee ................ | 349/58 |
| 6,667,780 B1 * | 12/2003 | Cho ................ | 349/58 |
| 2002/0080298 A1 * | 6/2002 | Fukayama ......... | 349/58 |
| 2003/0043310 A1 * | 3/2003 | Cho ................ | 349/58 |
| 2003/0043314 A1 | 3/2003 | Lee et al. | |
| 2004/0183957 A1 * | 9/2004 | Han ................ | 349/58 |
| 2005/0062902 A1 * | 3/2005 | Fukayama ......... | 349/58 |
| 2005/0073624 A1 * | 4/2005 | Lee et al. ......... | 349/58 |
| 2005/0243238 A1 * | 11/2005 | Cha et al. ......... | 349/58 |
| 2005/0259191 A1 * | 11/2005 | Park et al. ........ | 349/58 |
| 2006/0007367 A1 * | 1/2006 | Cho ................ | 349/58 |

FOREIGN PATENT DOCUMENTS

| | | |
|---|---|---|
| JP | 04-315127 A | 6/1992 |
| JP | 09-147618 | 6/1997 |
| JP | 2002-072174 | 3/2002 |
| KR | 2002-0000353 A | 5/2002 |
| TW | 530182 B | 5/2003 |

OTHER PUBLICATIONS

Database WPI, Section PQ, week 200245, Derwent Publications Ltd., GB; Class P81, AN 2002-423718, XP-002309699.
Patent Abstracts of Japan, vol. 017, No. 141 (P-1506), Mar. 23, 1993 for JP 04-315127.

* cited by examiner

*Primary Examiner*—James A. Dudek
(74) *Attorney, Agent, or Firm*—Katten Muchin Roseman LLP (57) ABSTRACT

A liquid crystal display device includes a liquid crystal panel, at least one optical sheet substantially rectangular in shape, where first and second openings are formed on the end edges of one side of the optical sheet at a predetermined interval, a main frame in which the optical sheet(s) are placed, and a sub-frame arranged above the main frame, in which the main frame is provided with first small protrusions jutting upward corresponding to the first openings at the top surface, while the rear surface of the sub-frame is provided with second small protrusions jutting downward corresponding to the second openings, thereupon the first small protrusions are inserted into the first openings of the optical sheet(s) and the second small protrusions are inserted into the second openings to connect and install the sub-frame to the main frame, and the optical sheet(s) are then aligned and fixed. Accordingly, the optical sheets are aligned better and firmly fixed to achieve larger display screens and thinner liquid crystal display devices.

10 Claims, 7 Drawing Sheets

LIQUID CRYSTAL DISPLAY DEVICE

TECHNICAL FIELD

The present invention relates to a liquid crystal display device, more specifically to a liquid crystal display device in which the alignment and the fixing of optical sheets is improved to achieve larger display screens and thinner devices.

BACKGROUND ART

In conventional liquid crystal display devices, several optical sheets are generally inserted between a light guiding plate and a liquid crystal panel and usually affixed to a main frame by using double-sided adhesive tape.

However, when the liquid crystal panel is moved or forcefully struck from the outside, there have been cases where the optical sheets were damaged because they could not expand or contract freely, being firmly fixed by double-sided adhesive tape, causing crimps to occur. Likewise, there have been cases where the display surface would become contaminated when the adhesive agent of the double-sided adhesive tape melts due to heat generated by a light source, if the adhesive quality of the double-sided adhesive tape is inferior. Further, the liquid crystal display device was also preferably made thicker through the use of greater amounts of double-sided adhesive tape, thereby entailing higher costs.

Consequently, a liquid crystal display device created with the use of mechanical components or members to align and fix the optical sheets firmly in lieu of double-sided adhesive tape, has been introduced.

Figure 6:
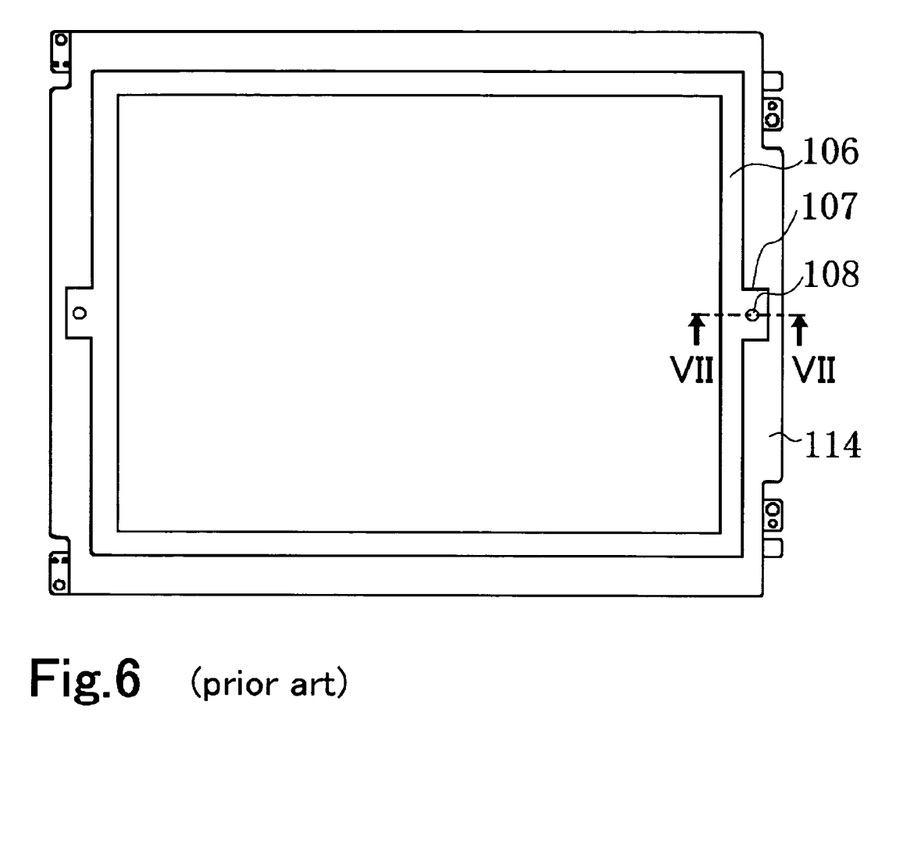
FIG. 6 is a plane view of an example of a conventional liquid crystal display device.
Figure 7:
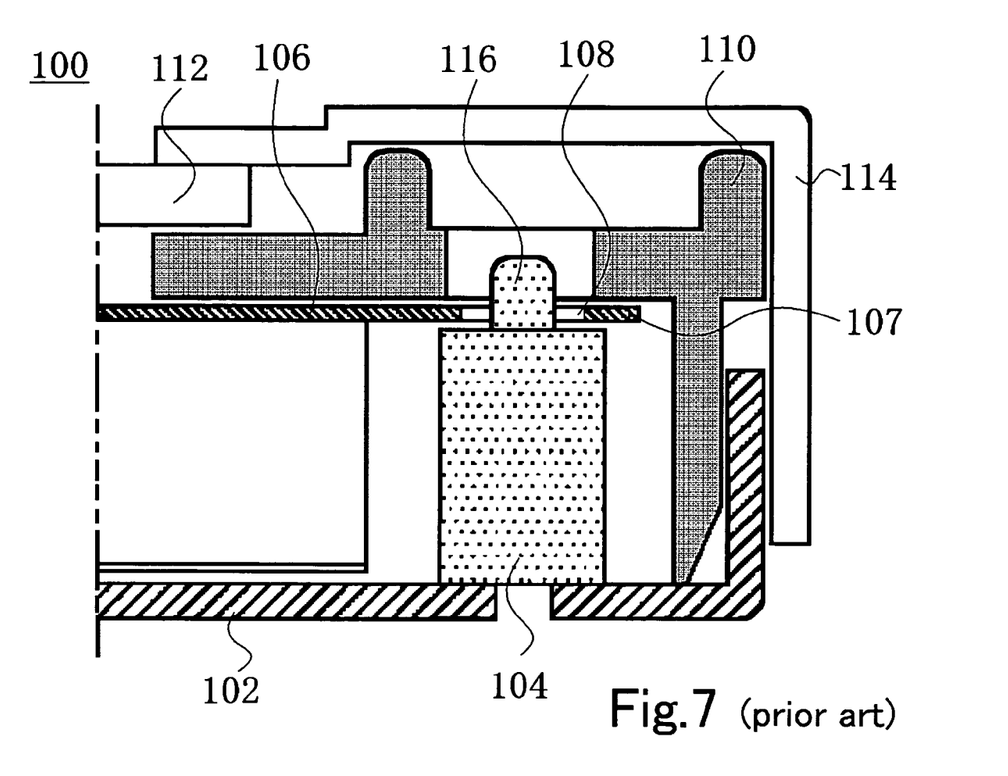
FIG. 7 is an enlarged sectional view at VII—VII of FIG. 6.

For example, as shown in FIGS. 6 (plane view) and 7 (sectional view at VII–VII of FIG. 6), in the liquid crystal display device 100 disclosed in Japanese Patent Laid-Open Publication No. 2002-72174, shafts 104 disposed on both sides of the floor of a main frame 102 are inserted into openings 108 provided in tabs 107 of an optical sheet 106, a guide panel 110 is installed to the main frame 102, a liquid crystal panel 112 and a case top 114 are arranged on the upper surface of the guide panel 110, and the optical sheet 106 is thereafter aligned and fixed and the liquid crystal panel 112 is installed. The shafts 104 are entirely columnar in shape, while columnar protrusions 116 having a diameter smaller than that of the lower portion of the shafts 104 are formed on top thereof, to align and fix the optical sheet 106 on both sides thereof.

According to this constitution, since the shafts 104 set on the main frame 102 fix the optical sheet 106, the probability of avoiding the adverse effect due to movement of the liquid crystal panel 112 and external vibration is increased compared to the case where the optical sheet 106 is affixed with double-sided adhesive tape.

Further, in the illumination apparatus disclosed in Japanese Patent Laid-Open Publication No. 1997-147618, to align and fix the optical sheet by using a mechanically processed frame, openings are severally provided in tabs provided on one side of a diffusion plate, a light guiding plate and a reflector, while protruding pins are formed on one side of a lower frame and holes for receiving the pins are provided on an upper frame, and the pins are inserted into the openings provided in the tabs of the diffusion plate, the light guiding plate and the reflector to hook the upper frame to the lower frame. In such manner, the diffusion plate, the light guiding plate and the reflector are fixed between the two frames.

In the known fixing method of the optical sheet described above, since adhesive tape is not used, the occurrence of crimps can be minimized to a certain extent while at the same time the contamination of the display surface due to the melting of the adhesive agent can be prevented, thereby enhancing work efficiency.

However, in the liquid crystal display device 100 disclosed in Japanese Patent Laid-Open Publication No. 2002-72174, the use of a plurality of uniquely shaped shafts 104 is required, and the shafts 104 have to be manufactured separately. Therefore, as the number of requisite components has increased, installation thereof into the main frame 102 is troublesome, thereby impairing work efficiency. In addition, the height of the protrusions of the shafts 104, which are designed to protrude from the opening of the guide panel 110, is greater than the thickness of the optical sheet 106. For this reason, it is impossible to extend the peripheral edge of the liquid crystal panel 112 to the opening portion of the guide panel 110, and the display screen of the liquid crystal panel is therefore made narrow. In addition, since the columnar protrusions 116 protrude from the upper surface of the shafts 104, it is impossible to make the liquid crystal display device 100 thinner. Moreover, since openings 108 are provided in the tabs 107 protruding at the central portion of both sides of the optical sheet 106, the optical sheet 106 must be uniquely shaped, and if openings are provided on the side edge of the optical sheet 106 without providing the tabs 107, the display screen becomes narrower due to the size of the openings.

Further, since it is fixed firmly on both sides, crimps could occur when the optical sheet expands and contracts due to heat, thereby causing damage thereto.

Furthermore, the illumination apparatus disclosed in the above-described Japanese Patent Laid-Open Publication No. 1997-147618 is aligned by fitting the pins of the lower frame into the holes of the upper frame. However, since the upper frame usually comprises a thin plate, the pins protrude from the surface of the upper frame, and to prevent this, it is necessary to make the tabs thicker. When the pins protrude from the upper frame, the liquid crystal panel cannot be placed on the pins, so the panel should be arranged in such manner as to avoid the pins, requiring the upper frame to be wider. As a result, the display screen of the liquid crystal panel becomes substantially smaller.

SUMMARY OF THE INVENTION

The present invention has been created to solve the above-described problems of the prior art, and it is the object of the invention to provide a thinner liquid crystal display device with a larger display screen by improving the alignment and the fixing of the optical sheet.

According to one aspect of the present invention, a liquid crystal display device comprises a liquid crystal panel, at least one optical sheet substantially rectangular in shape, where first and second openings are formed on the end edges of one side of the optical sheet at a predetermined interval, a main frame in which the optical sheet(s) are placed, and a sub-frame arranged above the main frame, wherein the main frame is provided with first small protrusions jutting upward corresponding to the first openings at the top surface of the optical sheet, while the rear surface of the sub-frame is provided with second small protrusions jutting downward corresponding to the second openings of the optical sheet, and the first small protrusions are inserted into the first openings of the optical sheet(s) and the second small protrusions are inserted into the second openings of the optical sheet(s) to connect and install the sub-frame to the main frame, and the optical sheet(s) are thus aligned and fixed.

According to another aspect of the present invention, a liquid crystal display device comprises a liquid crystal panel, at least one optical sheet substantially rectangular in shape, where first and second openings are formed on the end edges of one side of the optical sheet at a predetermined interval, a main frame in which the optical sheet(s) are placed, pedestals formed on the main frame, and a sub-frame arranged above the main frame, wherein the main frame is provided with first small protrusions jutting upward corresponding to the first openings at the top surface of the optical sheet(s), while the rear surface of the sub-frame is provided with second small protrusions jutting downward corresponding to the second openings of the optical sheet(s), and the first small protrusions are inserted into the first openings of the optical sheet(s) and the second protrusions are inserted into the second small openings of the optical sheet(s), to connect and install the sub-frame to the main frame, and the optical sheet(s) are thus aligned and fixed, wherein the pedestals consist of linear protrusions, while a gap for housing lead wire is formed between one side surface of the linear protrusions and the inner wall of one side of the main frame, and a light guiding plate is fixed between another side surface of the linear protrusions and the inner wall of another side of the main frame.

In the liquid crystal display device of the present invention, it is preferable that the first small protrusions be provided on the pedestals formed on the main frame, and that the height of the first and second small protrusions be substantially the same or slightly greater than the thickness of the optical sheet(s).

Further, in the liquid crystal display device of the present invention, it is preferable that several first and second openings be provided, and that the first and second small protrusions be correspondingly provided to match each of the first and second openings. Furthermore, it is preferable that a window be formed at the center of the sub-frame where the sub-frame is shaped in such manner as to cover the upper surface of the peripheral side wall of the main frame.

The liquid crystal display device according to the present invention constituted in the manner described above exhibits the following superior effects. Specifically, the optical sheet (s) are aligned and fixed by the first and second small protrusions provided in the main frame and the sub-frame from vertical directions without making the first small protrusions penetrate the sub-frame. In this way, the peripheral edge of the liquid crystal panel can be extended more closely to the peripheral side edge of the sub-frame even if the width of the latter is made narrower, so that the display screen of the liquid crystal panel can be made larger.

Further, since the optical sheet(s) are fixed only on one side of the main frame, the optical sheet(s) can move freely when they expand or contract during use due to heat generated by the light source because one side of the optical sheet(s) remains fixed while the other end is free, and thus distortion of or crimps forming on the optical sheet(s) can be prevented. Additionally, since adhesive tape is not used, melting of the adhesive agent does not occur, and therefore display quality is not affected and ultimately, the level of efficiency of assembly work is improved.

Moreover, since the small protrusions can integrally form part of the two frames, the number of components is reduced, making assembly work more efficient.

Furthermore, according to the liquid crystal display device of the present invention, the first small protrusions do not protrude from the frame piece of the sub-frame when the sub-frame is connected and installed to the main frame. Accordingly, the optical sheet(s) are aligned and fixed by the first and second small protrusions provided on the main frame and the sub-frame from vertical directions in a stable manner, and therefore, the window of the sub-frame can be made larger and concurrently, the liquid crystal display device can be made thinner.

Further still, according to the liquid crystal display device of the present invention, the lead wires and the like extending outwardly from the light guiding plate or the light source can be firmly established in the main frame by utilizing the pedestals, without the need for providing separate means for fixing them.

BRIEF DESCRIPTION OF THE DRAWINGS

FIG. 3A is a plane view of a main frame, while

FIG. 4A is a plane view of a sub-frame, while

PREFERRED EMBODIMENTS OF THE INVENTION

The best embodiments for carrying out the present invention will be described hereafter with reference to the accompanying drawings. However, while the embodiments explained below exemplify the technical concept of the present invention, they are not in any way intended to restrict the application of the present invention to liquid crystal display devices, since other embodiments included in the scope of the claims equally apply to other kinds of devices.

Figure 1:
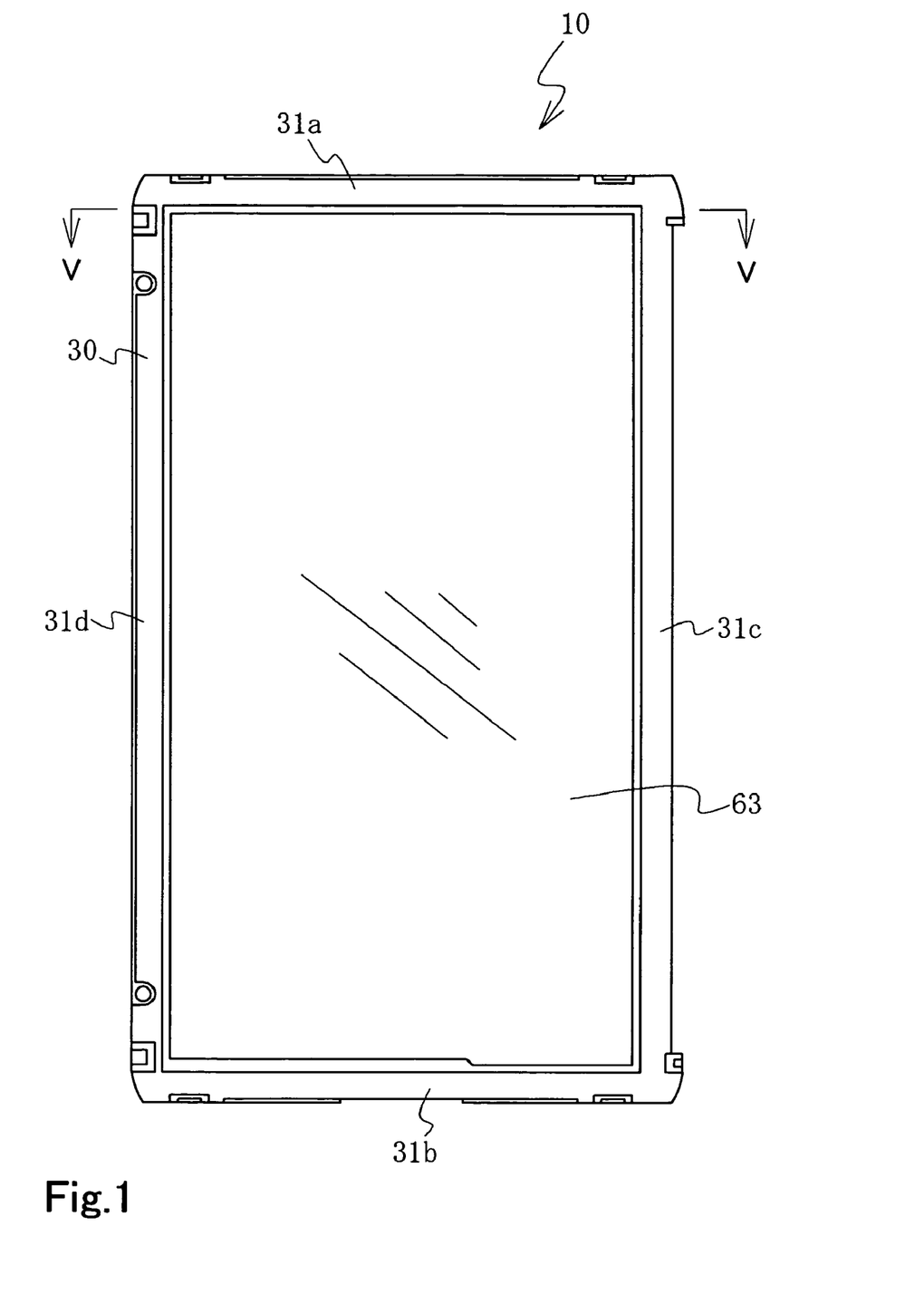
FIG. 1 is a plane view of the liquid crystal display device according to one embodiment of the present invention.
Figure 2:
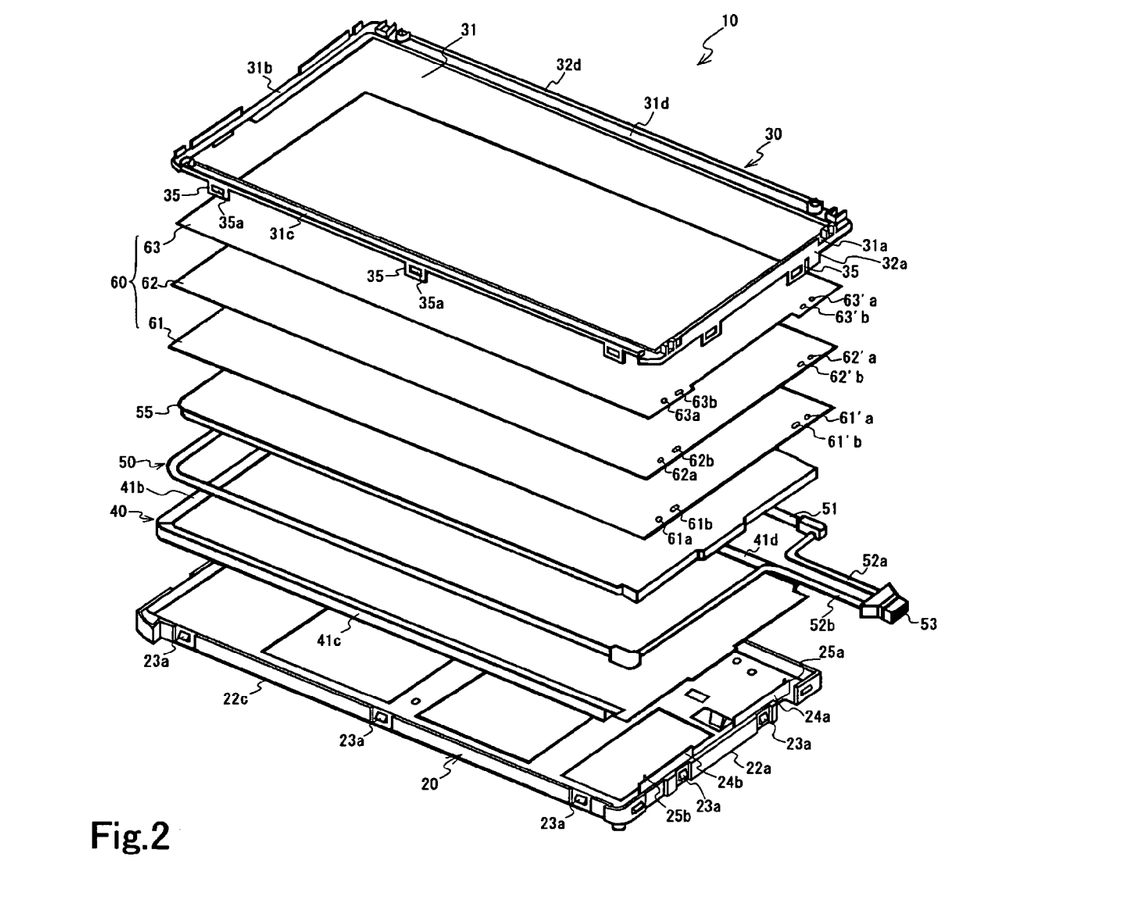
FIG. 2 is an exploded perspective view of the liquid crystal display device of FIG. 1.

As shown in FIG. 2, a liquid crystal display device 10 is provided with a light source 50, a flat light guiding plate 55 for transmitting light from the light source 50, a reflector 40 disposed along the rear surface of the light guiding plate 55, and optical sheets 60 placed on the light guiding plate 55, in which the said components are laminated to form a body inserted between a main frame 20 and the sub-frame 30, and the laminated body is aligned and fixed by connecting and installing the sub-frame 30 to the main frame 20.

Each member constituting the liquid crystal display device will be described herein below in detail with reference to FIGS. 2 to 4.

A liquid crystal display panel (not shown) used to explain the embodiment of the invention comprises a couple of regular rectangular glass substrates filled with liquid crystal and laminated to each other, a gate driver connected to the short side of one of the glass substrates by means of the Chip On Glass (COG) method or Tape Automated Bonding (TAB) method.

Figure 3A:
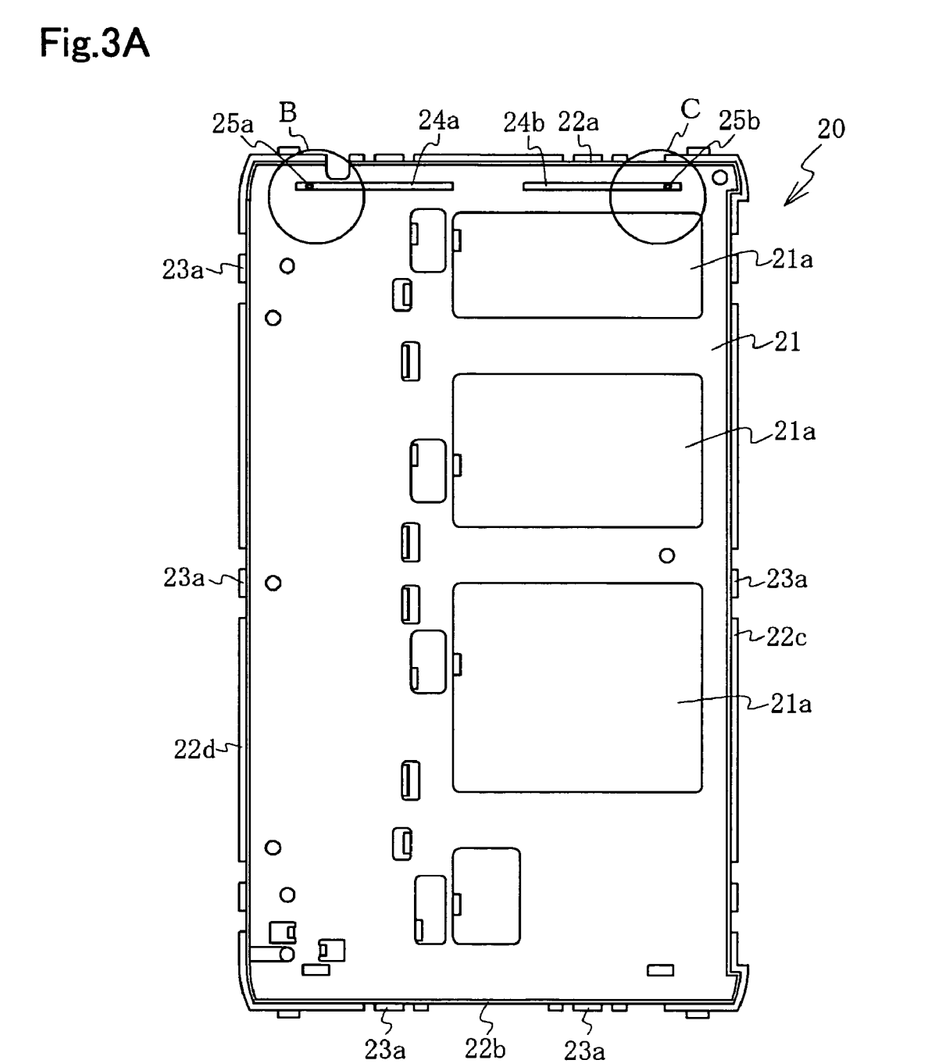

As shown in FIG. 3A, the main frame 20, which is made from synthetic resin material such as polycarbonate, consists of a shallow rectangular box-shaped body for the liquid crystal panel. Note that material other than synthetic resin can be used such as sheet metal to make the main frame 20. When sheet metal is used, the main frame can be formed more thinly without sacrificing strength because it is stronger than synthetic resin, so that the main frame can block out not only noise generated by the light source but also noise originating from the outside as it can be used as a ground, and is therefore preferable.

In the main frame 20, a plurality of openings 21a is formed on a bottom wall 21, and side walls 22a, 22b, 22c and 22d slightly higher compared to the thickness of the laminated body are vertically provided from the peripheral edges of the bottom wall 21. Several protruding hooks 23a are formed on the peripheral surface of each side wall 22a to 22d at a predetermined interval, and designed in such manner as to be engaged with hook ports 35a provided on the side walls of the sub-frame (described later).

Further, with a gap between them, two narrow pedestals (linear protrusions) 24a, 24b are made to reside close to and parallel with the inner wall surface of one side wall 22a among the side walls 22a to 22d. The height of the pedestals is substantially similar to the thickness of the light guiding plate 55 (refer to FIG. 2). Lead wires 52a, 52b (refer to FIG. 2) extending from the light source 50 are housed between one side of the pedestals 24a, 24b and the inner wall surface of the side wall 22a, and the light guiding plate 55 is fixed between the other side of the pedestals 24a, 24b and the side wall 22b.

Figure 3B:
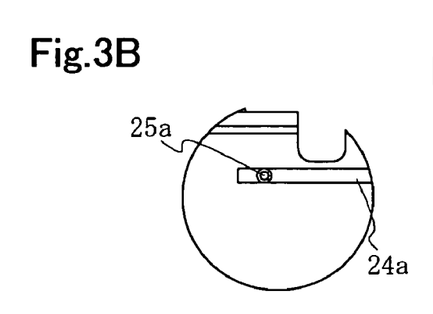
FIGS. 3B and 3C are enlarged plane views of the B and C areas of FIG. 3A, respectively.
Figure 3C:
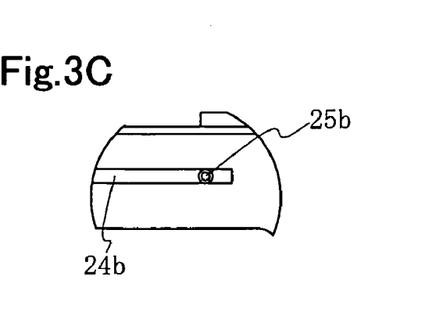

As shown in FIGS. 3B and 3C, small pin-shaped protrusions 25a, 25b projecting upwardly are formed on top of each of the pedestals 24a, 24b, such that the tips thereof are provided at corresponding positions closer to each side wall 22c, 22d so as to fit into recesses 34a, 34b of the sub-frame 30 (described later). The height of the small protrusions 25a, 25b is substantially the same or slightly greater than the thickness of the optical sheets 60.

Although small protrusions 25a, 25b are provided at the top of the pedestals 24a, 24b in the above-described embodiment, they may also be located at the bottom wall 21 without providing for the pedestals (linear protrusions) 24a, 24b. Because they can be made shorter and are less prone to breaking if made to reside at the top of pedestals, and the entire edge in the optical sheets 60 can be put more with stability, providing them at such location is preferred. Note that the openings 21a provided on the bottom wall 21 function as heat-releasing ports which serve to release heat generated mainly from the light source.

Furthermore, although the pedestals 24a, 24b may be made to reside more closely to either one of the short sides of the main frame 20, it is preferable to put them near the side where the gate driver of the liquid crystal display panel arranged on the main frame 20 is positioned. This is because the picture-frame area where the gate driver is connected cannot help widening than the other picture-frame area where the gate driver is not connected, so that using this wide picture-frame area, the pedestals 24a, 24b can be arranged at positions where leakage of light is more hardly noticed when viewing an image diagonally in the design.

Figure 4A:
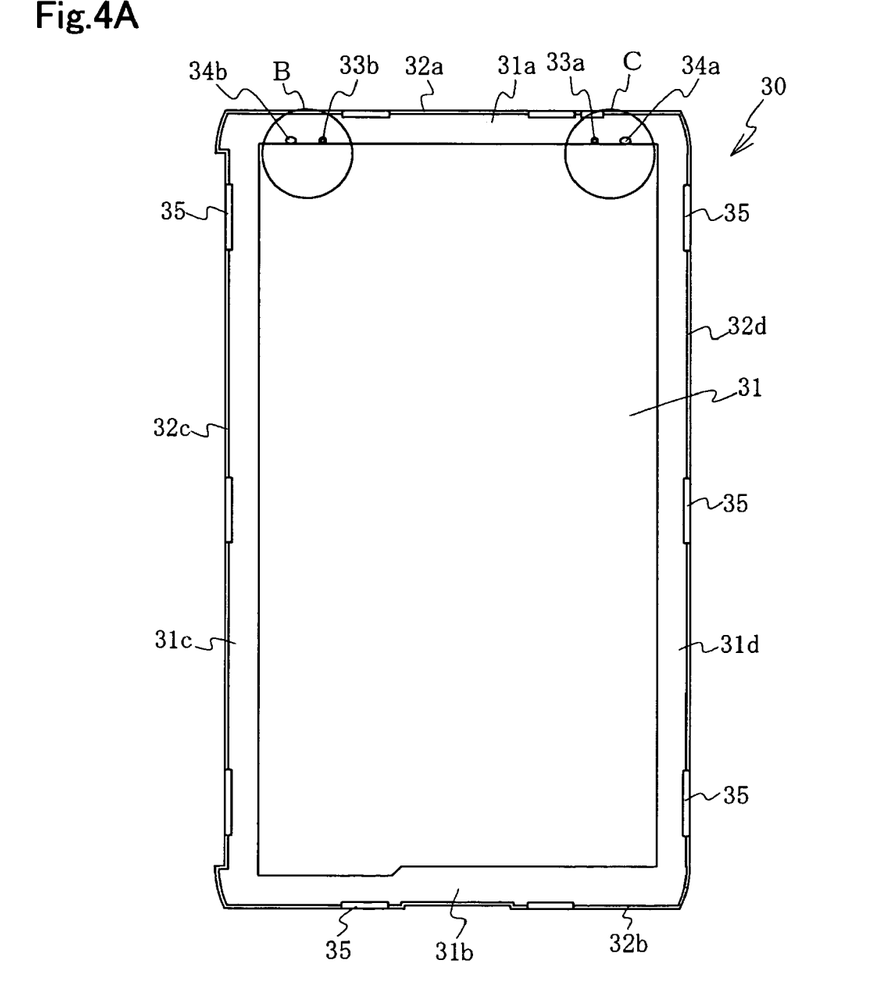
Figure 4B:
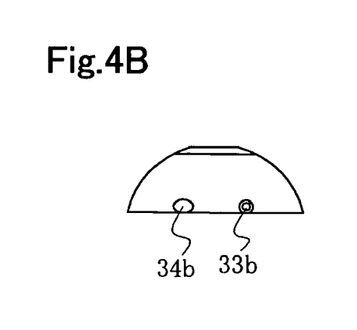
FIGS. 4B and 4C are enlarged plane views of the B and C areas of FIG. 4A, respectively.
Figure 4C:
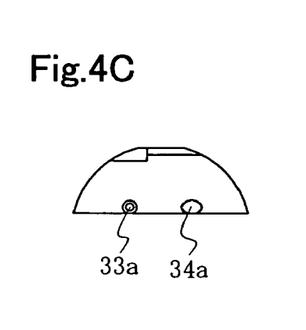

As shown in FIG. 4, the sub-frame 30, which is substantially similar in shape to that of the main frame 20, is arranged above the main frame 20, and made from synthetic resin material such as polycarbonate in the shape of a picture frame, with a window 31 formed at the center thereof. Note that the sub-frame 30 may be made from conductive resin containing conductive filler. The use of such material makes the suppression of noise generated by a fluorescent tube and the lead wires to the liquid crystal display panel possible.

The sub-frame 30 consists of narrow short side frame pieces 31a, 31b and narrow long side frame pieces 31c, 31d. The respective ends of the frame pieces 31a, 31b are connected to the respective ends of the frame pieces 31c, 31d to form corresponding corners while covering the upper surface of the side walls 22a to 22d of the main frame 20. Further, a plurality of protruding pieces 35 are formed on the sub-frame 30 so as to jut downward from the peripheral surfaces 32a to 32d while hook ports 35a are correspondingly formed on the protruding pieces 35.

The tips of the small protrusions 25a, 25b formed on pedestals 24a, 24b of the main frame 20 are inserted into the corresponding recesses 34a, 34b provided on the rear surface of the short side frame piece 31a of the sub-frame 30. Further, small pin-shaped protrusions 33a, 33b are formed within the vicinity of the recesses 34a, 34b. The height of the small pin-shaped protrusions 33a, 33b is almost the same as that of the protrusions 25a, 25b.

The reflector 40 is made of white resin film having high reflectance, with three sides bent from the rear surface so as to accommodate and surround the linear light source 50.

A fluorescent tube 51 comprising a cold-cathode tube or the like bent to be substantially U-shaped with sockets connected to the end portion thereof, lead wires 52a, 52b extending outwardly from each socket and an electric connector 53 connected to the tips of the lead wires 52a, 52b serves as the linear light source 50.

The light guiding plate 55 is of a predetermined thickness, e.g., about 2.6 mm at 7 inch size or about 3.5 mm at 8 inch size liquid crystal panel, formed by injection molding using acrylic resin.

The optical sheet 60 is composed of a diffusion sheet 61, a prism sheet 62 and protective sheet 63, and the thickness of the optical sheet 60 is thinner than that of the light guiding plate 55, and about 0.4–1.0 mm. On one side of the optical sheet 60, openings 61a to 63a, 61b to 63b, 61'a to 63'a, 61'b to 63'b are formed on positions corresponding to the small protrusions 25a, 25b of the main frame 20 and 33a, 33b of the sub-frame 30. The openings 61a to 63a, 61b to 63b, 61'a to 63'a, 61'b to 63'b are provided on opposite ends of one side of the optical sheet 60 such that the openings 61a to 63a, 61b to 63b are adjacent to each other and the openings 61'a to 63∝a, 61'b to 63'b are likewise adjacent to each other. For example, the openings 61a, 61b and 61'a, 61'b are provided on the diffusion sheet 61, and corresponding two pairs of openings are similarly provided in the prism sheet 62 and protective sheet 63. It is preferable that the shape of the openings 61a to 63a, 61b to 63b, 61'a to 63'a, 61'b to 63'b be of two types, where one kind is circular and the other is long and elliptic along the short side in order to deal with the expansion and contraction of the optical sheets due to heat. Consequently, the circular openings serve to align the optical sheets while the elliptic openings along the short side deal with deformation thereof by thermal expansion.

Next, the method of assembling the liquid crystal display device will hereafter be described with reference to FIG. 2.

The U-shaped linear light source 50 is disposed on the reflector 40, and the three sides 41b to 41d of the reflector 40 are bent from the rear surface to cover the tube body of the linear light source 50. Then, the reflector 40 is placed on the bottom wall 21 of the main frame 20, while the lead wires 52a, 52b extending from the light source 50 are housed in the gap between the pedestals 24a and 24b and the side wall 22a, and the tips thereof extend outwardly. On the other hand, the light guiding plate is affixed by causing one side edge thereof to come into contact with the inner wall surface of the side wall 22b of the main frame 20 by interposing the reflector 40, and causing the opposing side edge thereof to come into contact with the pedestals 24a, 24b. Accordingly, the linear light source 50, the reflector 40, the lead wires 52a, 52b and the light guiding plate 55 can thereafter be aligned and fixed.

Then, the optical sheet 60 is placed on the light guiding plate 55 by inserting the openings 61a to 61'a of the diffusion sheet 61 into the small protrusions 25a, 25b of the main frame 20. Similarly, the openings 62a, 62'a of the prism sheet 62 are inserted into the small protrusions 25a, 25*b*, and the openings 63*a*, 63'*a* of the protective sheet 63 are inserted into the small protrusions 25*a*, 25*b*.

After the optical sheet 60 is aligned and temporarily fixed to the small protrusions 25*a*, 25*b*, the small protrusions 33*a*, 33*b* are then inserted into the openings 61*b*, 61'*b* of the diffusion sheet 61, the openings 62*b*, 62'*b* of the prism sheet 62 and the openings 63*b*, 63'*b* of the protective sheet 63 to complete the fixing, and the hook ports 35*a* of the sub-frame 30 are thus made to engage with the protruding hooks 23*a* of the main frame 20.

By installing the sub-frame 30 to the main frame 20, the optical sheet 60 is sandwiched and fixed between the sub-frame 30 and the main frame 20.

Figure 5:
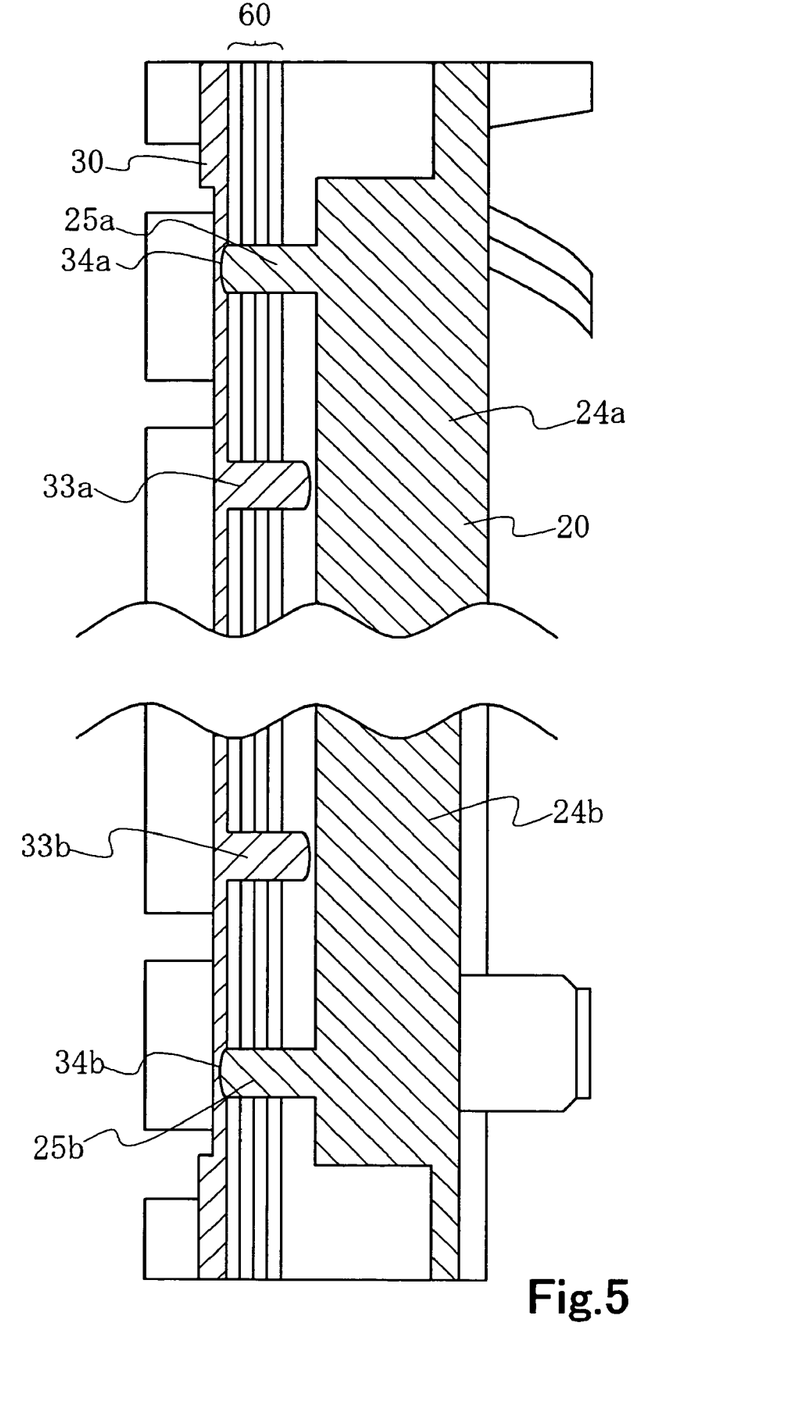
FIG. 5 is an enlarged sectional view at V—V of FIG. 1.

FIG. 5 is an enlarged sectional view showing the state where optical sheets 60 are fixed between the two frames. As shown in the drawing, the small protrusions 25*a*, 25*b* of the main frame 20 penetrate the openings of the optical sheets 61 to 63 and are fitted into the recesses 34*a*, 34*b* of the sub-frame 30. Although the small protrusions 25*a*, 25*b* penetrate the openings of one side of the optical sheets 61 to 63 and are fitted into the recesses 34*a*, 34*b* of the sub-frame 30, they do not jut upwardly as far as to penetrate the short side frame piece 31*a* of the sub-frame 30, so that they do not lie in the way when the liquid crystal panel (not shown) is placed on the upper surface of the frame piece 31*a*. Consequently, it is possible to make the frame piece 31*a* narrower in width. It is also possible to narrow the width of the other short side frame pieces 31*b*, 31*c*, 31*d* because they are not provided with such small protrusions. Therefore, since the width of the sub-frame 30 can be made narrower, the window 31 of the sub-frame 30 can be enlarged. On the other hand, the small protrusions 33*a*, 33*b* of the sub-frame 30 penetrate the other openings of the optical sheets 61 to 63 all the way to reach the top surface of the pedestals 24*a*, 24*b*.

With this assembly, the optical sheets 60 are aligned and fixed from vertical directions by the small protrusions 33*a*, 33*b* provided on the sub-frame 30 and the small protrusions 25*a*, 25*b* provided on the main frame 20. Generally the fixing of optical sheets is unstable if the small protrusions are formed only on either the sub-frame or the main frame, but stable fixing can be achieved by providing protrusions on both frames.

Note that while several pairs of small protrusions have been provided for on the sub-frame and the main frame in this embodiment, there is no restriction to providing for more. The number of pairs of small protrusions may be one or three or more.

What is claimed is:

1. A liquid crystal display device comprising:
    a liquid crystal panel;
    at least one optical sheet substantially rectangular in shape, where first and second openings are formed on the end edges of one side of the optical sheet at a predetermined interval,
    a main frame in which the said optical sheet(s) are placed; and
    a sub-frame arranged above the main frame,
    wherein the main frame is provided with first small protrusions jutting upward corresponding to the first openings at the top surface of the optical sheet(s), while the rear surface of the sub-frame is provided with second small protrusions jutting downward corresponding to the second openings of the optical sheet(s), and the first small protrusions are inserted into the first openings of the optical sheet(s) and the second small protrusions are inserted into the second openings of the optical sheet(s) to connect and install the sub-frame to the main frame, and the optical sheet(s) are thus aligned and fixed.

2. The liquid crystal display device according to claim 1, wherein the said first small protrusions are provided on the pedestals formed on the said main frame.

3. The liquid crystal display device according to claim 1, wherein the height of the said first and second small protrusions is substantially the same or slightly higher than the thickness of the said optical sheet(s).

4. The liquid crystal display device according to claim 1, wherein the said first and second openings are severally provided together, and the said first and second small protrusions are correspondingly provided to match each of the first and second openings.

5. The liquid crystal display device according to claim 1, wherein a window is formed at the center of the said sub-frame, and the said sub-frame is shaped in such manner as to cover the upper surface of the peripheral side wall of the said main frame.

6. A liquid crystal display device comprising:
    a liquid crystal panel;
    at least one optical sheet substantially rectangular in shape, where first and second openings are formed on the end edges of one side of the optical sheet at a predetermined interval,
    a main frame in which the said optical sheet(s) are placed,
    pedestals formed on the said main frame; and
    a sub-frame arranged above the main frame,
    wherein the main frame is provided with first small protrusions jutting upward corresponding to the first openings at the top surface of the optical sheet(s), while the rear surface of the sub-frame is provided with second small protrusions jutting downward corresponding to the second openings of the optical sheet(s), and the first small protrusions are inserted into the first openings of the optical sheet(s) and the second small protrusions are inserted into the second openings of the optical sheet(s) to connect and install the sub-frame to the main frame, and the optical sheet(s) are thus aligned and fixed,
    the said pedestals consisting of linear protrusions,
    while a gap for housing lead wire is formed between one side surface of the linear protrusions and the inner wall of one side of the said main frame, and
    a light guiding plate is fixed between another side surface of the linear protrusions and the inner wall of another side of the said main frame.

7. The liquid crystal display device according to claim 6, wherein the said first small protrusions are provided on the pedestals formed on the said main frame.

8. The liquid crystal display device according to claim 6, wherein the height of the said first and second small protrusions is substantially the same or slightly higher than the thickness of the said optical sheet(s).

9. The liquid crystal display device according to claim 6, wherein the said first and second openings are severally provided together, and the said first and second small protrusions are correspondingly provided to match each of the first and second openings.

10. The liquid crystal display device according to claim 6, wherein a window is formed at the center of the said sub-frame, and the said sub-frame is shaped in such manner as to cover the upper surface of the peripheral side wall of the said main frame.

* * * * *